(12) United States Patent
Afzal et al.

(10) Patent No.: US 11,496,528 B2
(45) Date of Patent: Nov. 8, 2022

(54) P-CSCF DISCOVERY THROUGH NRF

(71) Applicant: T-Mobile USA, Inc., Bellevue, WA (US)

(72) Inventors: Muhammad W. Afzal, Bellevue, WA (US); Khurram Mirza, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 9 days.

(21) Appl. No.: 17/090,842

(22) Filed: Nov. 5, 2020

(65) Prior Publication Data

US 2022/0141261 A1 May 5, 2022

(51) Int. Cl.
*H04L 65/1069* (2022.01)
*H04L 65/1045* (2022.01)
*H04L 65/1104* (2022.01)
*H04L 65/1016* (2022.01)

(52) U.S. Cl.
CPC ...... *H04L 65/1069* (2013.01); *H04L 65/1045* (2022.05); *H04L 65/1104* (2022.05); *H04L 65/1016* (2013.01)

(58) Field of Classification Search
CPC ............. H04L 65/1069; H04L 65/1006; H04L 65/105; H04L 69/22; H04L 67/28; H04W 76/10; H04W 76/12

USPC ........................................................ 370/325
See application file for complete search history.

(56) References Cited

U.S. PATENT DOCUMENTS

| | | | |
|---|---|---|---|
| 2019/0215729 A1* | 7/2019 | Oyman | H04L 65/80 |
| 2021/0044628 A1* | 2/2021 | Foti | H04L 65/104 |
| 2021/0099497 A1* | 4/2021 | Badar | H04L 65/105 |
| 2021/0266349 A1* | 8/2021 | Foti | H04L 65/1069 |

* cited by examiner

*Primary Examiner* — Glenford J Madamba (57) ABSTRACT

A solution for establishing a data traffic session (e.g., a voice call or a video call) for a user equipment (UE) on a network (e.g., a 5G cellular network) comprises: receiving, by a session management node, from a network repository, identification of a first session control node and a second session control node; receiving, by the session management node, from the UE, a request for identifying a session control node for supporting the data traffic session; determining whether the first session control node is available; and based on at least determining that the first session control node is available and not determining that the second session control node is available, sending, by the session management node, to the UE, identification of the first session control node and not sending identification of the second session control node.

20 Claims, 5 Drawing Sheets

P-CSCF DISCOVERY THROUGH NRF

BACKGROUND

In order to make a voice or video call in 5G, a user device (UE, e.g., cellphone or user equipment) sends a session initiation protocol (SIP) message to a proxy-call session control function (P-CSCF) node. The UE obtains a list of P-CSCFs from a session management function (SMF) node, randomly selects a P-CSCF from the list, and attempts to initiate the call via the selected P-CSCF node. Upon a failure (e.g., the P-CSCF is unavailable), as may be determined by a time-out period with no response from the P-CSCF (or a reject message), the UE will try another P-CSCF on the list. The unavailability of the first P-CSCF contacted by the UE thus introduces a delay.

The SMF obtains identification of P-CSCFs from a DNS (domain name system) server, with updates at approximately 15 minute intervals. If a P-CSCF goes down shortly after an update, the SMF will be providing UEs with identification of the unavailable P-CSCF for a significant period of time. Any UE that receives the stale P-CSCF information and selects the unavailable P-CSCF will experience an unnecessary delay, of approximately the length of the time-out period. This may degrade the user's experience.

SUMMARY

The following summary is provided to illustrate examples disclosed herein, but is not meant to limit all examples to any particular configuration or sequence of operations.

A solution for establishing a data traffic session (e.g., a voice call or a video call) for a user equipment (UE) on a network (e.g., a 5G cellular network) comprises: receiving, by a session management node, from a network repository, identification of a first session control node and a second session control node; receiving, by the session management node, from the UE, a request for identifying a session control node for supporting the data traffic session; determining whether the first session control node is available; and based on at least determining that the first session control node is available and not determining that the second session control node is available, sending, by the session management node, to the UE, identification of the first session control node and not sending identification of the second session control node.

BRIEF DESCRIPTION OF THE DRAWINGS

The disclosed examples are described below with reference to the accompanying drawing figures listed below, wherein.

Corresponding reference characters indicate corresponding parts throughout the drawings. References made throughout this disclosure. relating to specific examples, are provided for illustrative purposes, and are not meant to limit all implementations or to be interpreted as excluding the existence of additional implementations that also incorporate the recited features.

DETAILED DESCRIPTION

A solution for establishing a data traffic session (e.g., a voice call or a video call) for a user equipment (UE) on a network (e.g., a 5G cellular network) comprises: receiving, by a session management node (e.g., a session management function (SMF) node), from a network repository (e.g., a network repository function (NRF) node), identification of a first session control node and a second session control node (e.g., a first and second proxy-call session control function (P-CSCF) node); receiving, by the session management node, from the UE, a request for identifying a session control node for supporting the data traffic session; determining whether the first session control node is available; and based on at least determining that the first session control node is available and not determining that the second session control node is available, sending, by the session management node, to the UE, identification of the first session control node and not sending identification of the second session control node.

Aspects of the disclosure thus improve the speed of cellular voice and video call setup by, based on at least determining that the first session control node is available and that the third session control node is available, and not determining that the second session control node is available, sending, by the session management node, to the UE, identification of the first session control node and the third session control node and not sending identification of the second session control node. The SMF obtaining a list of available P-CSCFs from the NRF, rather than from a domain name system (DNS) server, improves expected call setup time. This is because the risk that a UE will experience an unnecessary delay of approximately the length of a P-CSCF time-out period is reduces.

A P-CSCF may register itself with the NRF, which functions to maintain up-to-date lists of available network resources, for example, a P-CSCF may interface with the NRF using protocols similar to what a Policy Control Function (PCF) uses to interface with the NRF. By using heartbeat signals, the NRF is able to detect when a P-CSCF goes down. Upon a P-CSCF going down, the NRF may remove that P-CSCF from a list that is sent to SMFs (upon an SMF discovery request) and may also push out a notification to SMFs that a formerly-available P-CSCF is now unavailable. The SMF is thus more timely updated about an unexpected availability of a P-CSCF and so will not identify the newly unavailable P-CSCF to a UE. The UEs will not have the newly unavailable P-CSCF on its list of P-CSCF candidates from which to select, thereby reducing the risk of a time-out.

Figure 1:
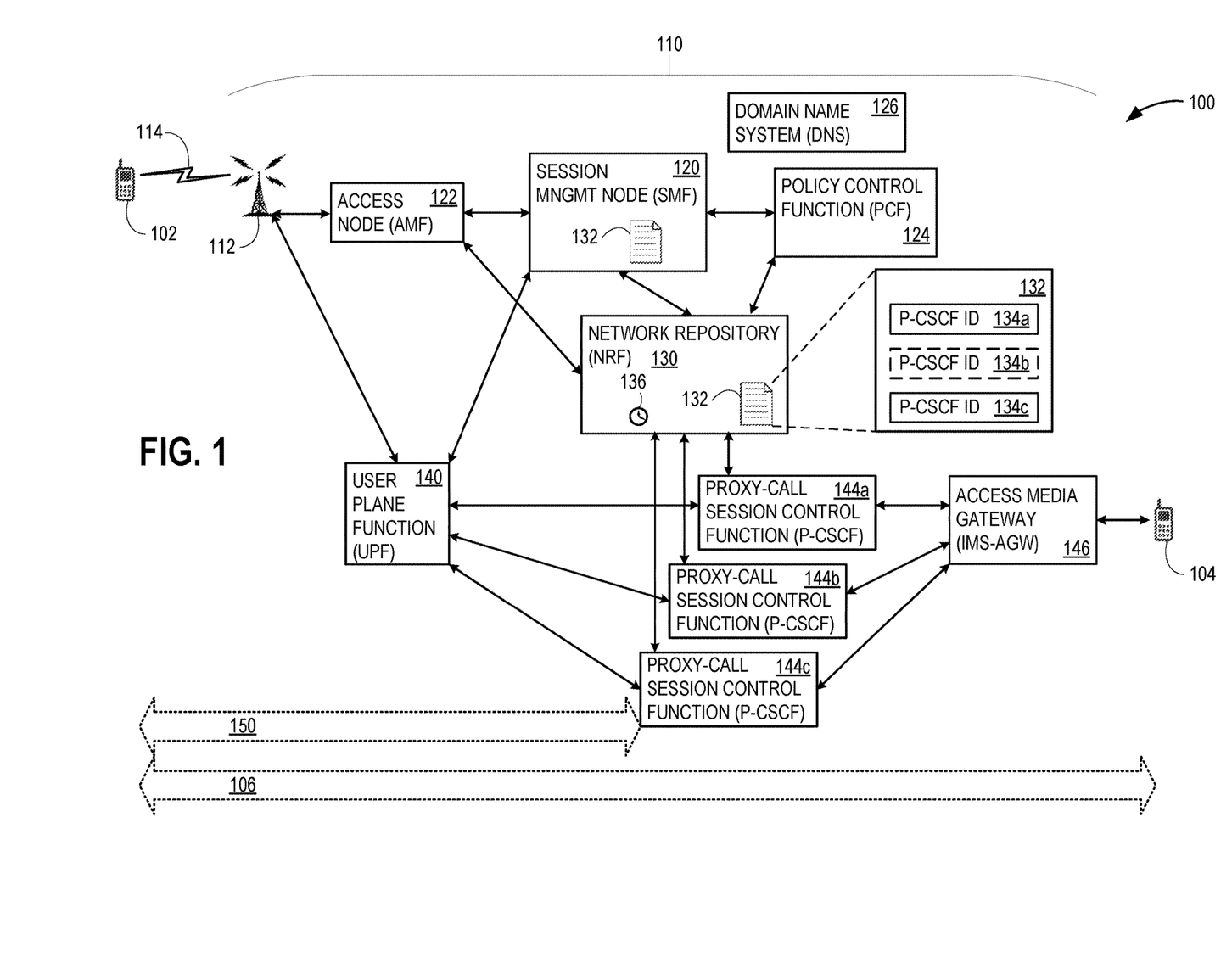
FIG. 1 illustrates an exemplary arrangement that may advantageously establish a data traffic session for a user equipment (UE) on a network, using proxy-call session control function (P-CSCF) discovery through a network resource function (NRF)

FIG. 1 illustrates an exemplary arrangement 100 that may advantageously establish a data traffic session 106 for a UE 102 on a network 110. Data traffic sessions include voice and video calls between UE 102 and a called device, such as a UE 104, over an Internet Protocol (IP) Multimedia SubSystem (IMS) core network. The call will pass from UE 102, over an air interface 114, through a radio access network (RAN) 112, a user plane function (UPF) 140, a selected one of a plurality of session control nodes 144*a*, 144*b*, and 144*c*

(e.g., P-CSCF nodes), and an IMS Access Media Gateway (IMS-AGW) 146. In some examples, each of session control nodes 144a, 144b, and 144c includes IMS Application Level Gateway (IMS-ALG) functionality. Although only a single UPF 140 and a single IMS-AGW 146 are shown, it should be understood that network 110 may have multiple ones of each type of node.

UE 102 learns the identification of session control nodes 144a, 144b, and/or 144c from a session management node 120 (e.g., an SMF node), which has a list 132 of available ones of session control nodes 144a, 144b, and 144c. UE 102 communicates with a selected one of session control nodes 144a, 144b, and 144c using session initiation protocol (SIP) messages 150. UE 102 communicates with session management node 120 via an access node 122 (e.g., an access and mobility management function (AMF) node). Session management node 120 obtains list 132 from a network repository 130 (e.g., an NRF node), rather than from a DNS server 126. In some examples, session management node 120 further updates list 132 based on notifications received from network repository 130, for example a notification that session control node 144b has become unavailable.

Each of session control nodes 144a, 144b, and 144c registers with network repository 130, and network repository 130 may monitor (detect) the availability of session control nodes using heartbeat signals (timed by with a timer 136). When timer 136 lapses with a heartbeat signal missing, network repository 130 may determine that the corresponding control node is unavailable. This permits network repository 130 to have timely status information regarding the availability of session control nodes 144a, 144b, and 144c. In some examples, session control nodes 144a, 144b, and 144c may use a protocol to communicate with network repository 130 that is similar to the protocol used by a policy control function (PCF) node 124. PCF node 124 performs network slicing, roaming and mobility management, and supports quality of service (QoS) policy and charging control functions. List 132 is illustrated as containing a session control node identification 134a for session control node 144a, a session control node identification 134b for session control node 144b, and a session control node identification 134c for session control node 144c. It should be understood that a different number of session control nodes may be identified in list 132.

Session control node identification 134b is shown in a dashed box to indicate that after, list 132 was compiled by network repository 130 (e.g., by each of session control nodes 144a, 144b, and 144c registering with network repository 130), session control node identification 134b is removed from list 132 at session management node 120 and network repository 130. Network repository 130 removes session control node identification 134b from its copy of list 132 based on at least the heartbeat signal from session control node 144b ceasing. Network repository 130 also pushes a notification to session management node 120 that session control node 144b is unavailable. Session management node 120 removes session control node identification 134b from its copy of list 132 based on at least receiving the notification from network repository 130 that session control node 144b is unavailable.

Figure 2:
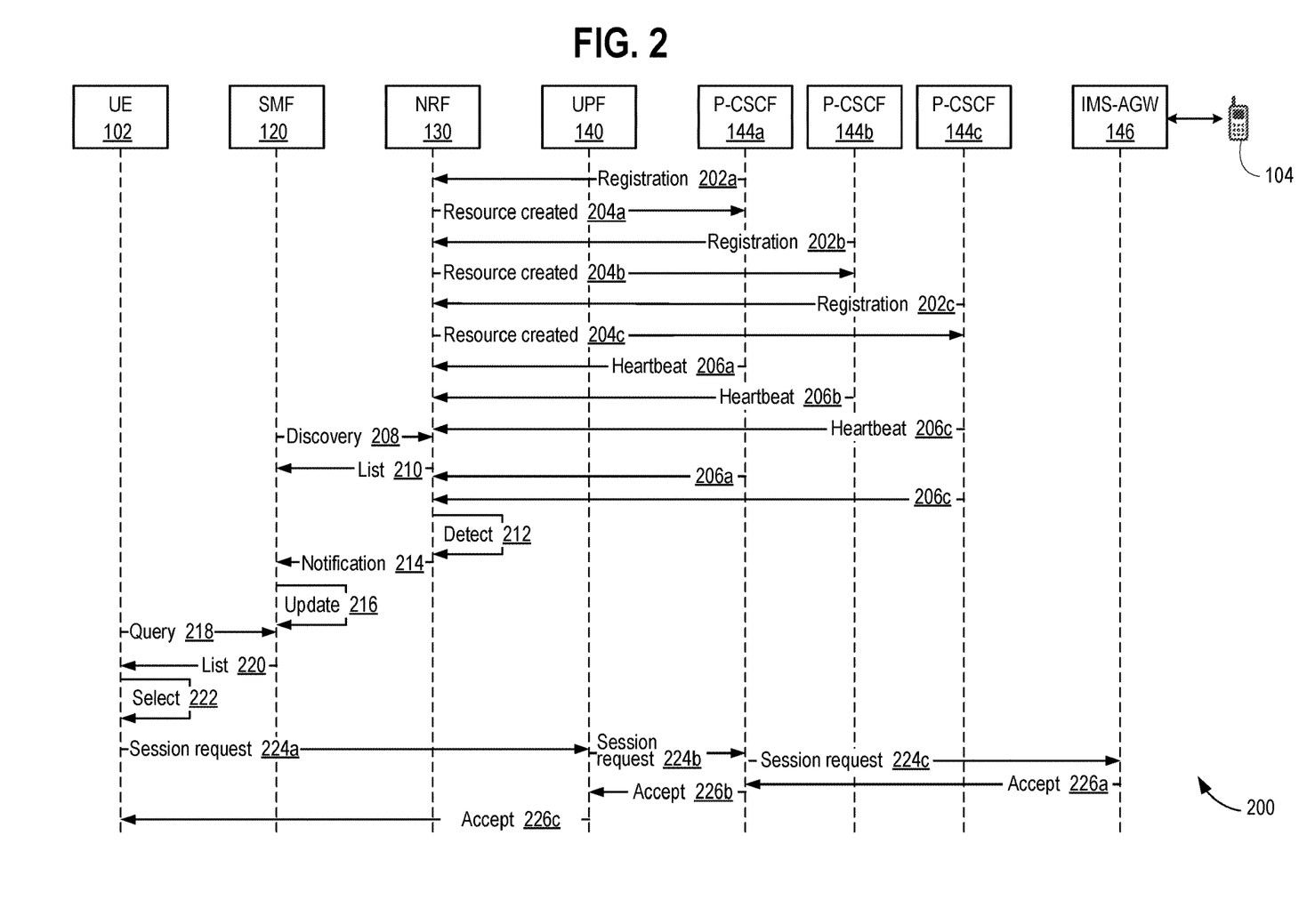
FIG. 2 illustrates a messaging sequence that may be used within the arrangement of FIG. 1.
Figure 3:
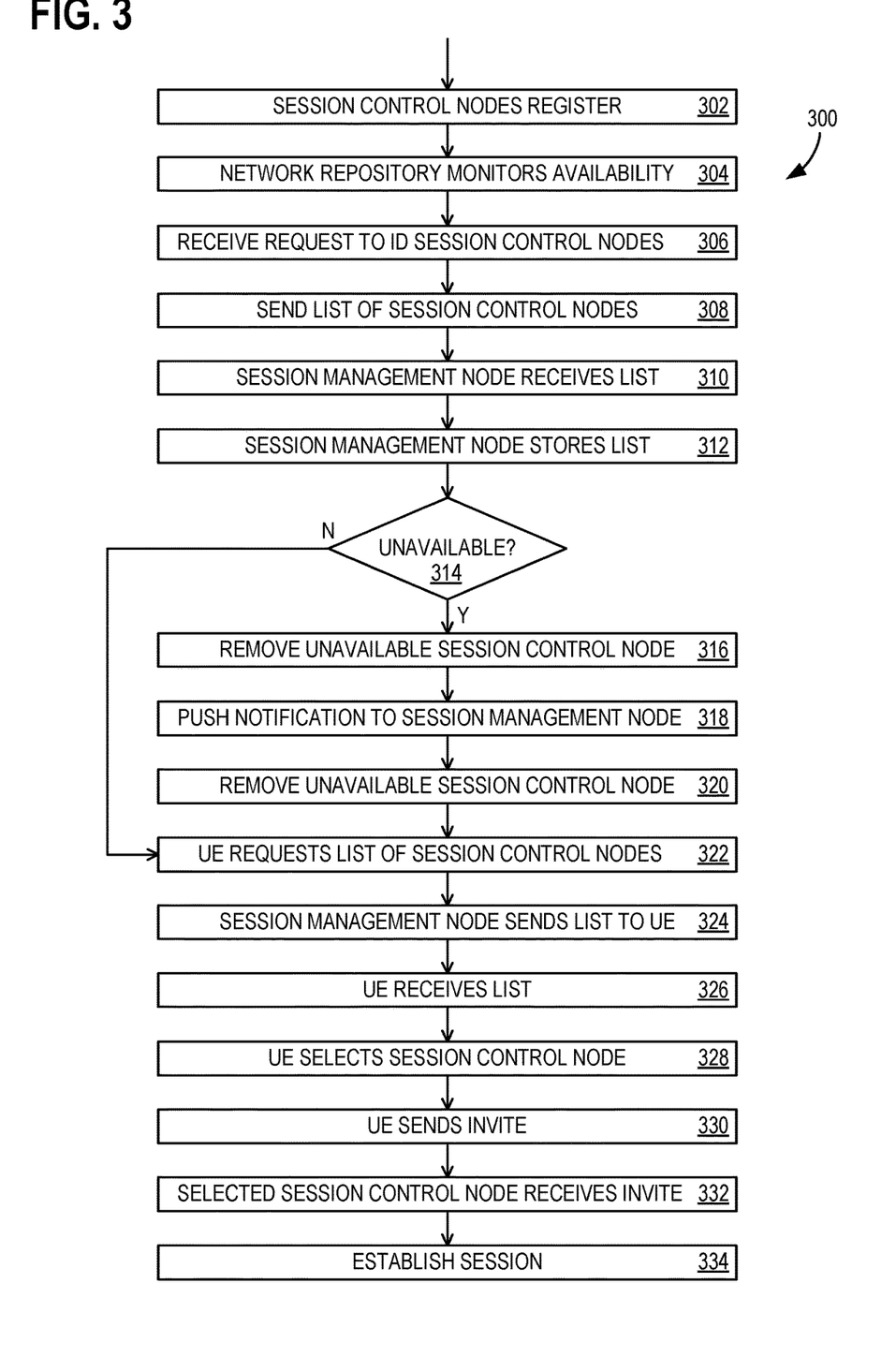
FIG. 3 illustrates a flow chart of exemplary operations associated the arrangement of FIG. 1.

Further description of FIG. 1 will be made with additional reference to FIGS. 2 and 3. FIG. 2 is a messaging sequence diagram 200 that shows a series of messages may be used within arrangement 100, and is described in conjunction with FIG. 3. FIG. 3 illustrates a flow chart 300 of exemplary operations associated with initiating data traffic session 106 for UE 102 on network 110, and the messages of messaging sequence diagram 200 occur during various operations of flow chart 300. In some examples, data traffic session 106 comprises a voice call or a video call. In some examples, at least a portion of messaging sequence diagram 200 and at least a portion of flow chart 300 may each be performed using one or more computing devices 500 of FIG. 5. FIGS. 1-3 should be viewed together.

At 302 (see FIG. 3), each of session control nodes 144a, 144b, and 144c registering with network repository 130 using registration request messages 202a, 202b, and 202c, respectively (see FIG. 2). Network repository 130 responds with resource created messages 204a, 204b, and 204c, respectively. Operation 302 thus includes detecting, by network repository 130, that session control node 144a (a first session control node) is available, session control node 144b (a second control node) is available, and session control node 144c (a third session control node) is available. In some examples, network repository 130 comprises an NRF node. In some examples, session control node 144a, session control node 144b, and session control node 144c each comprises a P-CSCF node. Network repository 130 places session control node identification 134a for session control node 144a, session control node identification 134b for session control node 144b, and session control node identification 134c for session control node 144c into list 132. In operation 304, network repository 130 monitors availability of session control nodes 144a, 144b, and 144c using a heartbeat signal 206a from session control node 144a, a heartbeat signal 206b from session control node 144b, and heartbeat signal 206c from session control node 144c.

At 306, session management node 120 sends a discovery message 208 to network repository 130. Operation 306 thus includes receiving, by network repository 130, from session management node 120, a request for identifying available session control nodes. In some examples, session management node 120 comprises an SMF node. Operation 308 includes sending, by network repository 130, to session management node 120, the identification of first session control node 144a, second session control node 144b, and third session control node 144c in list 132, using a message 210. Operation 310 includes receiving, by session management node 120, from network repository 130, identification of first session control node 144a, second session control node 144b, and third session control node 144c. Operation 312 includes storing, by session management node 120, list 132 of session control nodes 144a, 144b, and 144c identified by network repository 130.

As indicated in FIG. 2, heartbeat signal 206a from session control node 144a and heartbeat signal 206c from session control node 144c continue, but heartbeat signal 206b from session control node 144b ceases. A decision operation 314 (in FIG. 3), also indicated as a detection 212 (in FIG. 2) includes detecting, by network repository 130, that session control node 144b has become unavailable. Operation 316 includes removing, by network repository 130, session control node 144b from list 132 of session control nodes, for example, the copy of list 132 maintained by network repository 130. That is, network repository 130 removes session control node identification 134b for session control node 144b from its copy of list 132. At 318, network repository 130 notifies session management node 120 using a notification message 214. Operation 318 includes pushing, by network repository 130, to session management node 120, a notification that session control node 144b is unavailable. In some examples, session management node 120 polls network repository 130 for list 132 on a repeating schedule.

Session management node 120 maintains its own copy of list 132, which is updated in operation 320, also indicated as an update 216. Operation 320 includes based on at least receiving the notification that session control node 144b is unavailable, removing session control node 144b from list 132 of session control nodes, for example, the copy of list 132 maintained by session management node 120. Session management node 120 removes session control node identification 134b for session control node 144b from its copy of list 132. Thus, each of operations 316 and 317 include removing session control node 144b from list 132 of session control nodes. Removal from the copy maintained by network repository 130 prevents session control node 144b from being identified to any other session management nodes that send a discovery message to network repository 130, requesting a list of available session control nodes. Removal from the copy maintained by session management node 120 prevents session control node 144b from being identified to any UEs that send a query message to session management node 120, requesting a list of available session control nodes.

UE 102 requests list 132, of available session control nodes, from session management node 120, in operation 322, using a query message 218. Operation 322 also includes receiving, by session management node 120, from UE 102, a request for identifying a session control node for supporting data traffic session 106. In some examples, receiving the request for identifying a session control node comprises receiving the request for identifying a session control node through access node 122. In some examples, access node 122 comprises an AMF node. Operation 322 may also be cast as include determining, by session management node 120, whether session control node 144a is available. This may occur when determining that session control node 144a is available comprises locating session control node 144a in list 132 of session control node. Operation 322 may also include determining, by session management node 120, that session control node 144c is available (e.g., if session control node 144c is located on list 132).

Operation 324 includes, based on at least determining that session control node 144a is available and not determining that session control node 144b is available, sending, by session management node 120, to UE 102, identification of session control node 144a and not sending identification of session control node 144b. In some examples, operation 324 includes, based on at least determining that session control node 144a is available and that session control node 144c is available, and not determining that session control node 144b is available, sending, by session management node 120, to UE 102, identification of session control node 144a and session control node 144c and not sending identification of session control node 144b. That is list 132 is sent with session control node identification 134a for session control node 144a, and session control node identification 134c for session control node 144c, but session control node identification 134b for session control node 144b is not on list 132 (Having been removed in operation 320). Operation 324 uses a message 220.

Operation 326 includes receiving, by UE 102, the identification of session control node 144a and session control node 144c (in list 132). An operation 328, also indicated as a selection 222, includes, based on at least receiving, by UE 102, the identification of session control node 144a and session control node 144c, selecting, by UE 102, session control node 144a as a primary session control node from among session control node 144a and session control node 144c. In some examples, this selection is performed randomly.

At 330, UE 102 sends a session initiation message 224a (e.g., a SIP invite), which is forwarded by UPF 140 to session control node 144a as a message 224b, which is further forwarded to IMS-AGW 146 as a message 224c (and then on to the called device, UE 104). Operation 332 includes receiving, by session control node 144a, from UE 102, a session initiation message (224a, 224b) requesting data traffic session 106. In some examples, the session initiation message comprises a SIP message. In some examples, receiving the session initiation message comprises receiving the session initiation message through a UPF node.

Alternate configurations may be used, in some examples. Operation 334 includes, based on at least receiving identification of session control node 144a, establishing the data traffic session for UE 102 using session control node 144a. This occurs when IMS-AGW 146, session control node 144a, and UPF 140 respond with acceptance messages 226a, 226b, and 226c, respectively. Messages 224a-226c are within SIP messages 150 (shown in FIG. 1).

Figure 4:
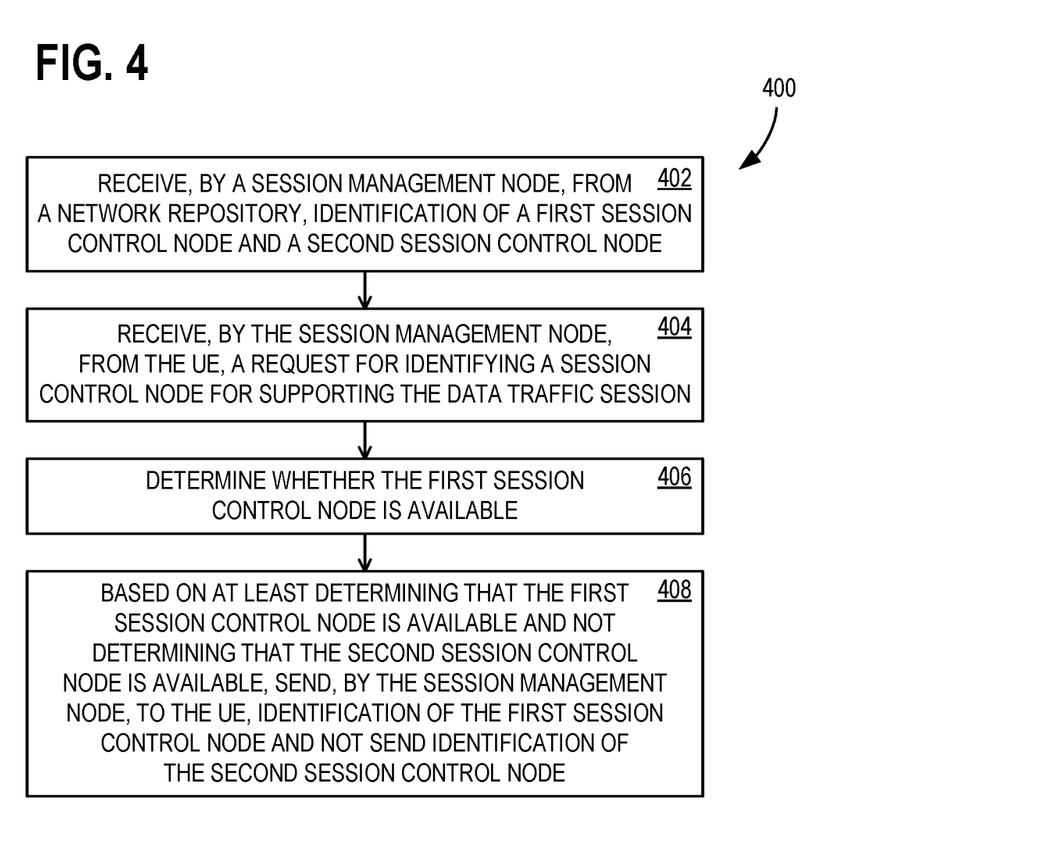
FIG. 4 illustrates another flow chart of exemplary operations associated with the arrangement of FIG. 1.

FIG. 4 illustrates a flow chart 400 of exemplary operations associated with establishing a data traffic session for a UE on a network. In some examples, at least a portion of flow chart 400 may be performed using one or more computing devices 500 of FIG. 5. Operation 402 includes receiving, by a session management node, from a network repository, identification of a first session control node and a second session control node. Operation 404 includes receiving, by the session management node, from the UE, a request for identifying a session control node for supporting the data traffic session. Operation 406 includes determining whether the first session control node is available. Operation 408 includes based on at least determining that the first session control node is available and not determining that the second session control node is available, sending, by the session management node, to the UE, identification of the first session control node and not sending identification of the second session control node.

Figure 5:
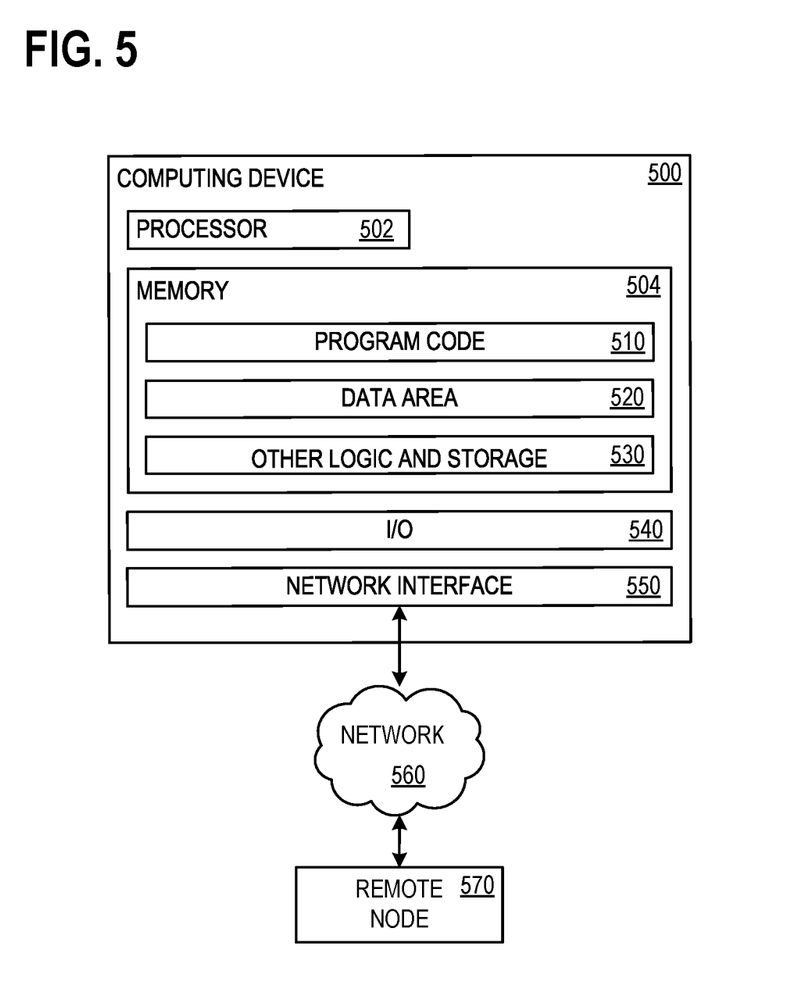
FIG. 5 illustrates a block diagram of a computing device that may be used as a component of the arrangement illustrated in FIG. 1.

FIG. 5 illustrates a block diagram of computing device 500 that may be used as a component of arrangement 100 of FIG. 1, for example, as any component described herein that may require computational or storage capacity. Computing device 500 has at least a processor 502 and a memory 504 that holds program code 510, data area 520, and other logic and storage 530. Memory 504 is any device allowing information, such as computer executable instructions and/or other data, to be stored and retrieved. For example, memory 504 may include one or more random access memory (RAM) modules, flash memory modules, hard disks, solid-state disks, persistent memory devices, and/or optical disks. Program code 510 comprises computer executable instructions and computer executable components including any instructions necessary to perform operations described herein. Data area 520 holds any data necessary to perform operations described herein. Memory 504 also includes other logic and storage 530 that performs or facilitates other functions disclosed herein or otherwise required of computing device 500. An input/output (I/O) component 540 facilitates receiving input from users and other devices and generating displays for users and outputs for other devices. A network interface 550 permits communication over a network 560 with a remote node 570, which may represent another implementation of computing device 500. For example, a remote node 570 may represent another of the above-noted nodes within arrangement 100.

ADDITIONAL EXAMPLES

An exemplary system for establishing a data traffic session for a UE on a network comprises: a processor; and a computer-readable medium storing instructions that are operative upon execution by the processor to: receive, by a session management node, from a network repository, identification of a first session control node and a second session control node; receive, by the session management node, from the UE, a request for identifying a session control node for supporting the data traffic session; determine whether the first session control node is available; and based on at least determining that the first session control node is available and not determining that the second session control node is available, send, by the session management node, to the UE, identification of the first session control node and not send identification of the second session control node.

An exemplary method of establishing a data traffic session for a UE on a network comprises: receiving, by a session management node, from a network repository, identification of a first session control node and a second session control node; receiving, by the session management node, from the UE, a request for identifying a session control node for supporting the data traffic session; determining whether the first session control node is available; and based on at least determining that the first session control node is available and not determining that the second session control node is available, sending, by the session management node, to the UE, identification of the first session control node and not sending identification of the second session control node.

One or more exemplary computer storage devices has computer-executable instructions stored thereon for establishing a data traffic session for a UE on a network, which, on execution by a computer, cause the computer to perform operations comprising: receiving, by a session management node, from a network repository, identification of a first session control node and a second session control node; receiving, by the session management node, from the UE, a request for identifying a session control node for supporting the data traffic session; determining whether the first session control node is available; and based on at least determining that the first session control node is available and not determining that the second session control node is available, sending, by the session management node, to the UE, identification of the first session control node and not sending identification of the second session control node.

Alternatively, or in addition to the other examples described herein, examples include any combination of the following:

- based on at least receiving identification of the first session control node, establishing the data traffic session for the UE using the first session control node;
- receiving, by the session management node, from the network repository, identification of a third session control node;
- based on at least receiving the request for identifying a session control node, determining, by the session management node, that the third session control node is available;
- based on at least determining that the first session control node is available and that the third session control node is available, and not determining that the second session control node is available, sending, by the session management node, to the UE, identification of the first session control node and the third session control node and not sending identification of the second session control node;
- detecting, by the network repository, that the first session control node is available and that the second session control node is available;
- receiving, by the network repository, from the session management node, a request for identifying available session control nodes;
- sending, by the network repository, to the session management node, the identification of the first session control node and the second session control node;
- detecting, by the network repository, that the second session control node has become unavailable;
- pushing, by the network repository, to the session management node, a notification that the second session control node is unavailable;
- storing, by the session management node, a list of session control nodes identified by the network repository;
- based on at least receiving the notification that the second session control node is unavailable, removing the second session control node from the list of session control nodes;
- determining that the first session control node is available comprises locating the first session control node in the list of session control nodes;
- the session management node comprises an SMF node;
- the network repository comprises an NRF node;
- the first session control node and the second session control node each comprises a P-CSCF node;
- the data traffic session comprises a voice call or a video call;
- receiving, by the first session control node, from the UE, a session initiation message requesting the data traffic session, wherein the session initiation message comprises an SIP message;
- receiving the session initiation message comprises receiving the session initiation message through a UPF node;
- receiving the request for identifying a session control node comprises receiving the request for identifying a session control node through an access node;
- the access node comprises an AMF node;
- the network repository monitors availability of session control nodes using heartbeat signals;
- based on at least receiving, by the UE, the identification of the first session control node and the third session control node, selecting, by the UE, the first session control node as a primary session control node from among the first session control node and the third session control node;
- determining whether the first session control node is available comprises determining, by the session management node, whether the first session control node is available; and
- removing the second session control node from the list of session control nodes comprises removing, by the session management node, the second session control node from the list of session control nodes.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure. It will be understood that the benefits and advantages described above may relate to one embodiment or may relate to several embodiments. When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of."

Having described aspects of the disclosure in detail, it will be apparent that modifications and variations are possible without departing from the scope of aspects of the disclosure as defined in the appended claims. As various changes may be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A method of establishing a data traffic session for a user equipment (UE) on a network, the method comprising:
   receiving, by a session management node, from a network repository, identification of a first session control node and a second session control node, wherein the session management node comprises a session management function (SMF) node, wherein the network repository comprises a network repository function (NRF) node, and wherein the first session control node and the second session control node each comprises a proxy-call session control function (P-CSCF) node;
   storing, by the session management node, a list of session control nodes identified by the network repository;
   receiving, by the session management node, from the network repository, the notification that the second session control node is unavailable;
   based on at least receiving the notification that the second session control node is unavailable, removing the second session control node from the list of session control nodes stored by the session management node;
   receiving, by the session management node, from the UE, a request for identifying a session control node for supporting the data traffic session; and
   without further querying the network repository, sending, by the session management node, to the UE, identification of the first session control node and not sending identification of the second session control node.

2. The method of claim 1, further comprising:
   based on at least receiving identification of the first session control node, establishing the data traffic session for the UE using the first session control node.

3. The method of claim 1, further comprising:
   receiving, by the session management node, from the network repository, identification of a third session control node;
   and
   without further querying the network repository, sending, by the session management node, to the UE, identification of the first session control node and the third session control node and not sending identification of the second session control node.

4. The method of claim 1, further comprising:
   detecting, by the network repository, that the first session control node is available and that the second session control node is available;
   receiving, by the network repository, from the session management node, a request for identifying available session control nodes;
   sending, by the network repository, to the session management node, the identification of the first session control node and the second session control node;
   detecting, by the network repository, that the second session control node has become unavailable; and
   pushing, by the network repository, to the session management node, a notification that the second session control node is unavailable.

5. The method of claim 4, further comprising:
   determining, by the session management node, whether the first session control node is available, wherein determining that the first session control node is available comprises locating the first session control node in the list of session control nodes.

6. The method of claim 1, wherein the data traffic session comprises a voice call or a video call.

7. The method of claim 1, further comprising:
   receiving, by the first session control node, from the UE, a session initiation message requesting the data traffic session, wherein the session initiation message comprises a session initiation protocol (SIP) message.

8. A system for establishing a data traffic session for a user equipment (UE) on a network, the system comprising:
   a processor; and
   a non-transitory computer-readable medium storing instructions that are operative upon execution by the processor to:
      receive, by a session management node, from a network repository, identification of a first session control node and a second session control node, wherein the session management node comprises a session management function (SMF) node, wherein the network repository comprises a network repository function (NRF) node, and wherein the first session control node and the second session control node each comprises a proxy-call session control function (P-CSCF) node;
      store, by the session management node, a list of session control nodes identified by the network repository;
      receive, by the session management node, from the network repository, the notification that the second session control node is unavailable;
      based on at least receiving the notification that the second session control node is unavailable, remove the second session control node from the list of session control nodes stored by the session management node;
      receive, by the session management node, from the UE, a request for identifying a session control node for supporting the data traffic session;
      without further querying the network repository, send, by the session management node, to the UE, identification of the first session control node and not sending identification of the second session control node.

9. The system of claim 8, wherein the operations are further operative to:
   based on at least receiving identification of the first session control node, establish the data traffic session for the UE using the first session control node.

10. The system of claim 8, wherein the operations are further operative to:

receive, by the session management node, from the network repository, identification of a third session control node;
and
without further querying the network repository, send, by the session management node, to the UE, identification of the first session control node and the third session control node and not sending identification of the second session control node.

11. The system of claim 8, wherein the operations are further operative to:
detect, by the network repository, that the first session control node is available and that the second session control node is available;
receive, by the network repository, from the session management node, a request for identifying available session control nodes;
send, by the network repository, to the session management node, the identification of the first session control node and the second session control node;
detect, by the network repository, that the second session control node has become unavailable; and
push, by the network repository, to the session management node, a notification that the second session control node is unavailable.

12. The system of claim 11, wherein the operations are further operative to:
determine, by the session management node, whether the first session control node is available, wherein determining that the first session control node is available comprises locating the first session control node in the list of session control nodes.

13. The system of claim 8,
wherein the data traffic session comprises a voice call or a video call.

14. The system of claim 8, wherein the operations are further operative to:
receive, by the first session control node, from the UE, a session initiation message requesting the data traffic session, wherein the session initiation message comprises a session initiation protocol (SIP) message.

15. One or more computer storage devices having computer-executable instructions stored thereon for establishing a data traffic session for a user equipment (UE) on a network, which, on execution by a computer, cause the computer to perform operations comprising:
receiving, by a session management node, from a network repository, identification of a first session control node and a second session control node, wherein the session management node comprises a session management function (SMF) node, wherein the network repository comprises a network repository function (NRF) node, and wherein the first session control node and the second session control node each comprises a proxy-call session control function (P-CSCF) node;
storing, by the session management node, a list of session control nodes identified by the network repository;
receiving, by the session management node, from the network repository, the notification that the second session control node is unavailable;
based on at least receiving the notification that the second session control node is unavailable, removing the second session control node from the list of session control nodes stored by the session management node;
receiving, by the session management node, from the UE, a request for identifying a session control node for supporting the data traffic session;
without further querying the network repository, sending, by the session management node, to the UE, identification of the first session control node and not sending identification of the second session control node.

16. The one or more computer storage devices of claim 15, wherein the operations further comprise:
based on at least receiving identification of the first session control node, establishing the data traffic session for the UE using the first session control node.

17. The one or more computer storage devices of claim 15, wherein the operations further comprise:
receiving, by the session management node, from the network repository, identification of a third session control node;
without further querying the network repository, sending, by the session management node, to the UE, identification of the first session control node and the third session control node and not sending identification of the second session control node.

18. The one or more computer storage devices of claim 15, wherein the operations further comprise:
detecting, by the network repository, that the first session control node is available and that the second session control node is available;
receiving, by the network repository, from the session management node, a request for identifying available session control nodes;
sending, by the network repository, from the session management node, the identification of the first session control node and the second session control node;
detecting, by the network repository, that the second session control node has become unavailable; and
pushing, by the network repository, to the session management node, a notification that the second session control node is unavailable.

19. The one or more computer storage devices of claim 18, wherein the operations further comprise:
determining, by the session management node, whether the first session control node is available, wherein determining that the first session control node is available comprises locating the first session control node in the list of session control nodes.

20. The one or more computer storage devices of claim 15,
wherein the data traffic session comprises a voice call or a video call.

* * * * *